Patented Nov. 4, 1952

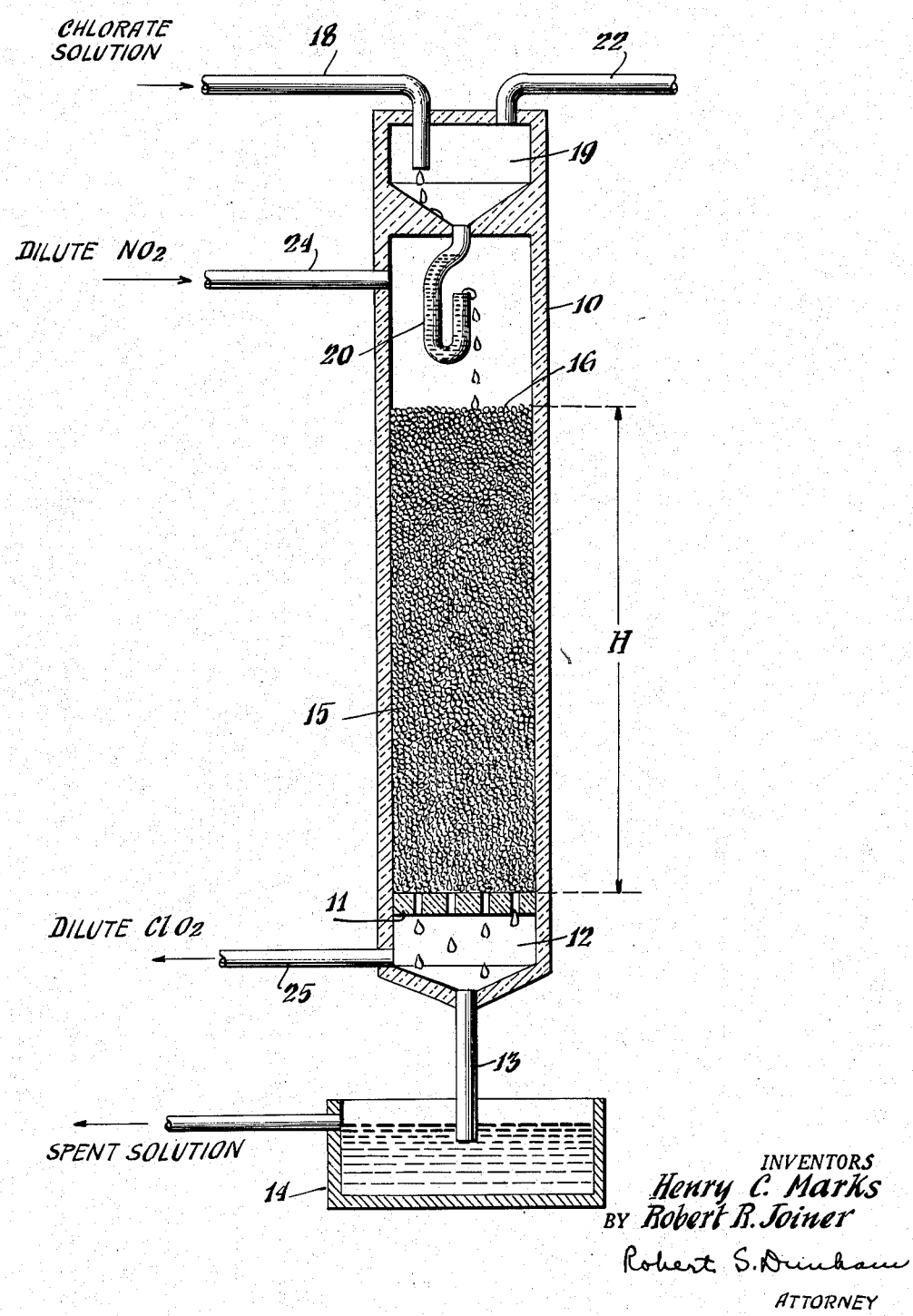

2,616,792

UNITED STATES PATENT OFFICE 2,616,792

MANUFACTURE OF CHLORINE DIOXIDE

Henry C. Marks, Glen Ridge, and Robert R. Joiner, Newark, N. J., assignors to Novadel-Agene Corporation, Belleville, N. J., a corporation of Delaware Application April 1, 1949, Serial No. 85,062

8 Claims. (Cl. 23—152)

This invention relates to methods of producing chlorine dioxide, which is an energetic oxidizing agent having important industrial and other uses. Under the conditions at which it is customarily employed chlorine dioxide is a gas, and moreover has a tendency to decompose, usually with explosive violence, unless handled with considerable care. For convenience and safety, a preferred practice is to produce chlorine dioxide at the locality of its use, and in fact to generate it only as required, so that there is no need to store the gas for any length of time or to package it for transportation. As a further safeguard against explosion and against other harm that might result from inadvertent release of the pure reagent, it is ordinarily diluted to a large extent with other gas which is suitably inert to chlorine dioxide and also inert, so far as necessary, to all materials that must be exposed to the diluted mixture.

For most purposes, a satisfactory method of making chlorine dioxide should be one that is easily controlled, without expert attention, and that uses commercially available materials and can be carried out with simple, inexpensive equipment. A particularly important factor is that of safety, with respect to explosion and other hazards, since the gas often has to be produced by more or less automatic equipment which is left to the attention (at least for considerable periods) of persons having no special technical understanding of apparatus and procedure in the art of manufacturing this gas, or in handling potentially dangerous reagents. Accordingly it is very desirable to have a process that is essentially foolproof and requires no such reagents. For example, an elsewhere proposed method for making chlorine dioxide by first adding concentrated nitric acid to a chlorate solution to provide a concentrated solution of nitric and chloric acids, and then running the produced reagent solution and diluted nitrogen peroxide gas countercurrently (i. e. in opposite directions) through a reaction tower or the like, is relatively unsuitable for purposes of the sort mentioned above, since it involves a relatively complex and hazardous process. Not only must there be equipment and personnel capable of handling with due care the primary ingredient of concentrated nitric acid solution, but the strong solution of nitric and chloric acids delivered to the reaction tower is a very hazardous material, for example in that any contact with only a small amount of organic matter can result in a violent explosion.

In addition to the desirability both of avoiding the handling of dangerous substances, and of affording a relatively inexpensive method, an outstanding requirement is ease of control of the process relative to the output of chlorine dioxide. Where large but variable quantities of a commodity or material are to be treated with the dilute gaseous product, for example as in the flour industry, both the economic factor and the facility of control are especially to be desired. Since convenient practice in making chlorine dioxide for these purposes is to provide a continuous or relatively continuous type of operation, where reagent materials are fed constantly to a reaction zone from which the desired and other products are withdrawn in a continuous manner, it is extremely advantageous to be able to control the rate of production by adjusting the rate of feed of the reagents. For that purpose the proportionality of effluent chlorine dioxide to input materials should be relatively uniform over a considerable range of rates of operation. Indeed it is especially desirable that such proportionality be maintained between the input of a single reagent, such as a reagent gas, and the output of chlorine dioxide, even though other supplied reagent material may not be varied in rate of feed exactly as the reagent gas.

Accordingly, the present invention is designed to provide effective and economical methods of producing chlorine dioxide, while achieving the described proportionality between input reagent gas and output of the active product, with uniformity and reliability over a considerable range of rates of such gaseous feed and chlorine dioxide output, and indeed over a relatively wide range of variation in the feed of both gaseous and non-gaseous reagents. A further and special feature of the invention is the attainment of these results, with useful economy of reagent, both gaseous and non-gaseous, so that for example in preferred types of operation at least about 50% of each incoming reagent material is usefully consumed for the production of chlorine dioxide. It will now be seen that under the described circumstances of proportionality, as attained by the present invention, the flow of treating gas, viz. diluted chlorine dioxide, to the locality of use can be easily and accurately controlled with respect to its active ingredient, simply by controlling (i. e. adjusting) the supply of reagent gas, or at least by conjoint regulation of feed of both gaseous and non-gaseous reagents to the reaction zone.

In an aspect of chief importance, the present invention embraces the discovery that the foregoing criteria of reliability, safety, economy and ease of control may be achieved by a procedure involving the passage of diluted nitrogen peroxide gas and a solution of a soluble chlorate such as sodium chlorate or calcium chlorate through a reaction zone, wherein certain conditions of proportionality, concentration and physical situation are satisfied within certain limits that have now been discovered and that are in large measure critical for the useful realization of chlorine dioxide production by reaction between nitrogen peroxide and such a chlorate solution. Indeed, it has specifically been found that instead of requiring the addition of concentrated nitric acid or the like and thereby establishing a strong solution of nitric and chloric acids to be treated with nitrogen peroxide, efficient reaction between the latter gas and a solution simply prepared from water and sodium chlorate, calcium chlorate or the like (i. e. other salt of chloric acid of like solubility, the term chlorate or chlorate salt being used herein to designate such salts as distinguished from the acid itself) may be achieved under conditions which have apparently not been recognized or reached heretofore. Indeed we have found that mere attempts to carry out the treatment of chlorate solution with nitrogen peroxide by following simple or conventional theories of gas and liquid contact reaction, are highly inadequate; whereas by observation of certain unusual operating criteria which have not previously been appreciated and which are embraced by the present invention a practical and workable process has now been achieved for these convenient materials.

In accordance with principles thus discovered, a presently preferred mode of carrying out the invention involves passing a mixture of nitrogen peroxide and diluent gas, e. g. air, concurrently with a solution of a chlorate such as described below (both the $NO_2$ concentration in the gas and the chlorate concentration in the solution having at least certain specific values) through a reaction zone where the solution is distributed in an extremely thin film over a surface area (provided by solution-supporting structure or other packing in the zone) of peculiarly large extent relative to the total volume of such zone. By such operation and by maintaining the proportion of nitrogen peroxide to chlorate within a convenient but significantly defined range, remarkably satisfactory results have been achieved, viz. a continuous and easily controlled output of chlorine dioxide, having suitable dilution and representing uniformly high and thus economic consumption of reagent materials (especially the chlorate). Such procedure, by reason also of its stability of control and its use of safe and inexpensive reactants, finds utility in practical manufacture of chlorine dioxide for many commercial purposes, including the service of flour treatment or the like.

For better illustration of certain aspects of the process, the accompanying drawing shows schematically one example of an apparatus or tower useful in carrying out the invention, the depicted view being essentially a vertical section of such apparatus, set forth in the nature of a flow diagram with respect to supplied reagents and withdrawn products.

As indicated hereinabove, certain minimal relations between the product chlorine dioxide and the supplied reagent are critically desirable for economic value in the process, for example in that at least 30% and preferably about 50% of the supplied nitrogen peroxide should be usefully converted by the desired reaction, and at least about 40% and preferably 50% or more of the chlorate should be likewise consumed. With such results the present process is of definite advantage, in comparison with other methods—such as those involving reaction between chlorine and sodium chlorite—that require a much more costly reagent than the chlorates.

Whereas under circumstances outside the limits expressed below the percent conversion of both chlorate and nitrogen peroxide to chlorine dioxide are apt to depend markedly both on the relative proportions of these materials as well as on their rates and conditions of feed under continuous operation, the present process is of special and unusual advantage in that so long as the described conditions are maintained, the conversion to chlorine dioxide based on the nitrogen peroxide input can be maintained constant over a wide range of total chlorine dioxide output. In consequence, for controlling the dose of chlorine dioxide being applied to any particular use, the operator of the present process can count on a specific proportion of chlorine dioxide for every quantity of nitrogen peroxide supplied, e. g. under preferred conditions approximately 1 volume of $ClO_2$ for every 2 volumes of $NO_2$ introduced. The practical value of this feature, by way of ease of control as explained above, will now be readily appreciated.

For practice of the process in a manner now preferred, apparatus of the general sort shown in the drawing has been found especially advantageous. The reaction tower 10 consists essentially of a long, upright, hollow cylinder constructed of glass, suitable plastic or other material inert to the reagents and reaction products involved. The cylinder may have a partition or false bottom 11, perforated to permit spent liquid to flow down through a lower chamber 12 and out through a discharge or waste pipe 13, which can have its lower end sealed in a body of such solution in a discharge vessel 14. Over the partition 11 the tower is packed, as more particularly described below, with granules, pellets, or the like, of suitable, inert material 15, e. g. to a height H above the partition. The region bounded by the cylindrical wall of the tower and the horizontal planes at the partition 11 and the upper level 16 of the packed material may be defined as the reaction zone.

At the head of the tower, provision is made for introducing reagent solution, e. g. at a more or less continuous, controlled rate, as by a pipe 18 through which solution flows or trickles into a feed chamber 19. From the bottom of the latter, the solution then travels through a trap 20 and discharges upon the head of the packed column of material 15, so as to flow down through the latter, preferably at a slow, controlled rate, and spreading out laterally as well as vertically so that the solid particles are substantially completely covered, where exposed, with a thin film of the liquid. If desired, advance of the liquid through the pipe 18 may be effected or promoted by maintaining a small suction or vacuum in the upper chamber 19 by appropriate connection to a supplemental conduit 22.

Gaseous reagent, e. g. a gaseous mixture of a minor proportion of nitrogen peroxide and a major proportion of diluent gas, is introduced at the head of the column, as through the conduit 24 opening into the space above the packing surface 16, while product gas, e. g. consisting of chlorine dioxide in admixture with other gas including the diluent, is withdrawn from the bottom of the column, as through a pipe 25, opening out of the lowermost chamber 12. It will be noted that in accordance with a feature of specific preference under the present invention, the gas and liquid travel concurrently through the column. While other apparatus may be employed in some cases to carry out the process, a particularly useful form of equipment, including appropriate metering devices cooperating to feed both solution and gas into a reaction tower of the character here shown, are disclosed and claimed in the copending application of George M. Booth, Serial No. 61,936, filed November 26, 1948, for Apparatus and Procedure for Preparing Gaseous Products.

As indicated, the operation involves introducing a relatively concentrated solution of a soluble chlorate together with a gaseous mixture containing diluent gas and nitrogen peroxide in selected concentration (as stated below) to the reaction zone, where the chlorate solution is preferably distributed as a very thin film over a surface area of selected, large magnitude relative to the volume of such zone. There the reaction takes place, and the effluent gas is drawn from the zone, containing a satisfactory concentration of chlorine dioxide, at a fully safe dilution. The spent solution is likewise continuously withdrawn, and may, if desired, be subjected to any desired treatment, e. g. for separation and recovery of its various constituents, including unused chlorate. According to present understanding, one important reaction, at least of a primary or over-all character, that takes place with the chlorate, such as sodium chlorate, may be represented by the following equation:

$$NaClO_3 + NO_2 \rightarrow NaNO_3 + ClO_2$$

While other or side reactions may occur, and may indeed have cooperative or other significant effect, the production of chlorine dioxide in the effluent gas and of a nitrate, such as sodium nitrate, in the spent liquid indicates that the above is significant of the evolution of chlorine dioxide in this method.

For use in the process, nitrogen peroxide may be obtained from any suitable source. For instance, it is at present commercially available in cylinders of customary type for packaging gas; nitrogen peroxide, e. g. as a liquid boiling at 21° C., is thus stored in such cylinders under pressure, and for the present process can be withdrawn through suitable pressure reducing instrumentalities and diluted by mixing it with a relatively considerable quantity of air, nitrogen, carbon dioxide or even oxygen, viz. any diluent gas suitably inert to the reagents of the process and to the produced chlorine dioxide. For reasons of economy air is at present preferred. Alternatively, nitrogen peroxide may be obtained from local generators, examples being those involving chemical procedure such as the reduction of nitric acid or a catalytic oxidation of ammonia, and electric discharge methods wherein, for instance, air or other mixture of nitrogen and oxygen is passed through an electric arc or spark.

It will be understood that in reference to nitrogen peroxide and in identifying such gaseous substance as $NO_2$ (sometimes called nitrogen dioxide), no attempt has been made to distinguish from a compound having the theoretical formula $N_2O_4$; indeed to the extent that existence of a compound having the latter formula can be demonstrated, it may be deemed to have essentially the same chemical properties as $NO_2$ and to be embraced by the term nitrogen peroxide. In fact, the only pertinent theory appears to be that nitrogen peroxide, as produced or found at ordinary temperatures, consists of a mixture of $NO_2$ and $N_2O_4$. It is likewise assumed that the more or less theoretical substance having the formula $N_2O_3$ does not warrant separate consideration or other mention here; such compound is apparently so unstable as to be relatively nonexistent, i. e. in that at ordinary temperatures any supposed $N_2O_3$ would in fact be or at least behave as a mixture of $NO$ and $NO_2$.

According to present understanding, the chlorate should be one having relatively high solubility in water. Sodium chlorate has been employed with excellent results, and among other alkali and alkaline earth metal salts, lithium, calcium and magnesium chlorates are very useful. Indeed calcium chlorate, having a very high solubility, appears substantially superior even to sodium chlorate, while potassium chlorate, having a low solubility of not more than about 0.6 molar is practically useless in the present process. With respect both to suitability of chlorates and concentrations to be employed in the process, the following table represents test results obtained at various levels of chlorate concentration in the solution. In the table, the percent yield is based on nitrogen peroxide, and the concentrations are expressed in mols of chlorate ion per liter:

| $ClO_3$ concentration (mols/l.) | Percent yield |
|---|---|
| 0.57 | 1 |
| 3.3 | 31 |
| 4.4 | 44 |
| 5.5 | 51 |
| 7.5 | 60 |

In these tests the lowest concentration represented use of potassium chlorate, the highest employed calcium chlorate, and the intermediate values from 3.3 to 5.5 mols per liter were solutions of sodium chlorate. It will be understood that all references herein to molar values of concentration of various chlorates are with respect to chlorate ion, i. e. mols per liter of $ClO_3$.

Concentrations of less than 2 molar are of very little value in operations such as herein described, the yield being then less than 20%. A chlorate content of not less than 3 mols per liter is of at least some utility, but peculiarly satisfactory and thus distinctive results are achieved within the presently preferred range, viz. concentrations of about 5 molar or higher. In the case of calcium chlorate, solutions approaching 10 molar (in chlorate ion) can be made up and employed with some advantage, although the improvement in yield rises at a progressively smaller rate for concentrations much above 5 molar. Under presently preferred conditions employing sodium chlorate at concentrations of 5 mols per liter or slightly more, the yield based on the chlorate is about 50% to 60%. In the case of calcium chlorate, the yield based on chlorate is in the neighborhood of 60% for the use of chemically equivalent quantities of $NO_2$ and calcium chlorate, the yield as based on $NO_2$ rising even above 60% with the higher concentrations of calcium chlorate. As an example of a convenient and satisfactory reagent composition where sodium chlorate is employed, a 5.5 molar solution may be mentioned, corresponding to 590 grams per liter of sodium chlorate.

The volume concentration of nitrogen peroxide in the supplied gaseous mixture, e. g. as introduced to the tower through the pipe 24, is an important factor. For results of substantial utility the concentration should be at least about 2% by volume (all references to gas concentrations herein being measured in volume percentage, unless otherwise stated); for example, even at a concentration of 2.5% in the supplied gas, the conversion of $NO_2$ to chlorine dioxide is ordinarily well below the presently preferred value of 50% or so. At nitrogen peroxide concentrations above 5% the yield comes quite close to 50%, optimum conditions being represented by an $NO_2$ concentration of 10% or more. For usual purposes the content of nitrogen peroxide should be no higher than about 20%, i. e. to avoid a chlorine dioxide concentration in the effluent greater than a safe, non-explosive value of 10%. Present preference is to employ the nitrogen peroxide at a concentration of about 10%, the remaining 90% being suitable inert gas such as mentioned above. The diluent gas, and thus the gaseous mixture, may either be dry or contain some water vapor. At the lower concentrations of $NO_2$, it is of advantage to humidify the diluting gas, because otherwise the large volume of the latter relative to the chlorate solution tends to evaporate sufficient water as to cause crystallization of the chlorate and consequent clogging of the reaction tower.

It is at present preferred to introduce the nitrogen dioxide in a proportion to the chlorate which is of the order of 1 mol of $NO_2$ for each mol of chlorate ion supplied. Under such circumstances, e. g. operation at an intended or approximate control point where the $NO_2$ and chlorate are present as chemical equivalents, a variation in the over-all ratio of the two reagents of plus or minus 25% or so does not appear to alter the percent yield based on nitrogen peroxide; indeed up to 30% excess $NO_2$ may be employed without decreasing such yield. At 50% or greater excess, tests indicate that the yield based on $NO_2$ decreases, and indeed the conversion factor then becomes undesirable dependent on the amount of $NO_2$ supplied. Departures of the $NO_2$ to chlorate ratio below unity, even to very low values, do not appear to affect the percent conversion of one gas to the other, but the utilization of chlorate becomes less and less as the feed ratio decreases, especially upon departure of more than 25% below the preferred $NO_2$ to $ClO_3$ ratio of 1:1. Some advantage, particularly where fairly good conjoint control of the solution feed and gas feed can be had, is obtained by employing up to, say 30% excess $NO_2$ over the stoichiometric equivalents. In such case, the yield based on chlorate is markedly increased, e. g. to a value of 60% where the chlorate solution is 5.5 molar, and even up to 70% when the chlorate concentration is as high as 7.5 molar.

Within certain limits, the temperature is not highly critical for purposes of the present process. At very low temperatures in the reaction tower, however, the percent conversion of $NO_2$ to chlorine dioxide is reduced; for instance at 13° C., the ratio is affected to an extent ordinarily undesirable. Completely normal operation prevails at 25° C., and even up to 40° C. there is little or no change in chlorine dioxide production. When temperatures of 60° C. are reached a slight decrease in conversion is evidenced, although not of very significant extent. The reaction itself appears to generate some heat, so that in view of the above understanding of temperature conditions no attention need ordinarily be paid to them providing the chlorate solution is not excessively cold when it enters the tower. In some cases, as where the apparatus may be situated in a cold locality and may be employed for extended periods at production rates far below an intended average output, some thermal insulation around the reaction zone is desirable to prevent adverse effects of low temperature.

In the light of many tests, it is found that the physical or mechanical character of the reaction zone, and specifically the situation of the chlorate solution and its surface exposed to the reagent gas, are of extreme importance. Thus using apparatus of the sort indicated in the drawing, the tower should be packed in such a way as to produce a critically definite effect. More specifically, it appears that all of the solution flowing through the reaction zone should proceed as a thin film moving over the granules or particles or other distributed surface of the packing. If appreciable amounts of the solution are present in the tower in bulk, such as ordinary sized drops, the yield or conversion factor has been found to decrease materially. It also appears, perhaps as a corollary or a necessary structural prerequisite to the attainment of more immediately significant conditions, that the spaces through which the gas moves should not be excessively large with respect to the particles or granules of packing over which the liquid runs. According to present experience, a factor of outstanding importance may be defined as the surface area per unit volume, i. e. considering volume as representing the total volume of the reaction zone and including such volume as is occupied by the solid material of the packing. Such ratio should apparently be high in itself, preferred results not having been obtained simply on provision of extended surface area without regard to other factors; a simple relation of output to surface area does not appear to exist in any such sense as that the quantitative output of chlorine dioxide might be relied upon to increase or decrease (without affecting the yield) merely upon increasing or decreasing the area of exposed solution surface.

By way of illustration of a reaction zone arrangement found to be eminently suitable, a tower (of the general nature illustrated at 10) was employed, having an inside diameter of one inch, and filled with packing 15 to a height H of 69.5 cm. The granules of the packing were small alundum cylinders averaging 2.9 mm. in diameter by 2.88 mm. in length (i. e. altitude) and having an average weight of 0.0389 gram. The volume of the packed or reaction zone, e. g. between levels 11 and 16, was 352 cc. The alundum particles were packed down so that the quantity of them in such zone had a total weight of 431.5 grams. As determined simply from the gross dimensions of the particles and without respect to their surface irregularity or porosity, which is nevertheless important as explained below, the total surface area of the packing was 0.436 square meter, with 40% voids, i. e. 40% of the volume of 352 cc. being empty space between granules, available for passage of liquid and gas.

Operation with this tower, over a range of rates of gaseous reagent feed, was very satisfactory; each volume of $NO_2$ introduced produced one-half volume of $ClO_2$ up to a maximum output of 40 to 45 grams $ClO_2$ per hour. The following Examples I and II represent specific instances of such operation, the chlorate solution and dilute nitrogen peroxide being introduced at the top and the product gas and spent solution being withdrawn at the bottom, generally in the manner described above in connection with the drawing.

Example I

The chlorate solution consisted of water and 588 grams per liter of sodium chlorate, and was introduced at the rate of 1 cc. per minute. The supplied gas consisted of 5% by volume of $NO_2$ in air, fed into the tower at the rate of 3.2 liters per minute. The feed ratio was thus 1.19 mols of $NO_2$ per mol of sodium chlorate. The reaction proceeded effectively, the effluent gas containing 13 grams per hour of chlorine dioxide, which represented 50% conversion of the nitrogen peroxide and 60% conversion of the sodium chlorate. Thus the product gaseous mixture delivered from the tower contained 2.5% $ClO_2$ by volume. The effluent, spent liquid contained, in addition to sodium nitrate, 121 grams per liter of sodium chlorate and 12% by weight of nitric acid.

Example II

Sodium chlorate solution of the same initial concentration as in Example I was fed into the tower at the rate of 2 cc. per minute. The supplied gas mixture consisted of 20% nitrogen peroxide by volume in air, introduced at the rate of 1.35 liters per minute, the reagent ratio being 1.03 mols of $NO_2$ per mol of $NaClO_3$. The resulting chlorine dioxide production was 23 grams per hour, representing 50% conversion of each of the reactants $NO_2$ and sodium chlorate. The effluent gas contained 10% $ClO_2$ by volume, while the effluent solution contained sodium nitrate, and also 256 grams per liter of sodium chlorate and 18% by weight of nitric acid.

As further illustration of effective reaction zone conditions, another tower used had an inside diameter of two inches and was filled with packing 15 to a height H of 29¼ inches. The packing again consisted of small alundum cylinders, averaging 3.5 mm. in diameter and 2.1 mm. in length, each weighing, on the average, 0.0612 gram. The total volume of the reaction zone, e. g. between planes 11 and 16, was 1500 cc., the granular material being packed down so that a total of 2036 grams of it (i. e. the small cylinders) was present in the defined zone. The packing thus provided a total surface area of 1.78 square meters, with about 34% voids, the latter being equal to about 500 cc., and the area being measured as before.

Practice of the process with this two-inch tower was found to yield very nearly one-half volume of $ClO_2$ for every volume of $NO_2$ introduced, even when the total $ClO_2$ output is varied over a wide range, e. g. from 15 grams per hour to 200 grams per hour. Examples III and IV, below, are specific instances of operation with the described two-inch tower; the materials being introduced and withdrawn in the same manner as in the preceding examples.

Example III

The chlorate solution, containing 588 grams per liter of sodium chlorate, was supplied to the tower at a rate of 10 cc. per minute, while 13.5 liters per minute of a gaseous mixture containing 10% $NO_2$ by volume in air were concurrently introduced. As in all other examples herein, the solution flowed or trickled down through the tower as a thin film which appeared to be distributed over substantially all of the exposed alundum surfaces. The ratio of supplied reagents was 1.01 mols of $NO_2$ per mol of sodium chlorate. The output, a gaseous mixture containing slightly less than 5% chlorine dioxide, comprised 108 grams per hour of $ClO_2$, and represented 47% conversion of the nitrogen peroxide and about 50% conversion of sodium chlorate.

Example IV

In this instance of operation with the two-inch tower, chlorate solution of the same concentration was supplied at 20 cc. per minute, and the reagent gas mixture, consisting of 20% nitrogen peroxide in air, was introduced at 14 liters per minute, affording a ratio of 1.07 mols of $NO_2$ per mol of chlorate. The production was at the rate of 211 grams of $ClO_2$ per hour, providing a conversion of 44% of the $NO_2$ used. The output gas contained about 9% chlorine dioxide.

Since in other operations the same tower was run at as low an output as 14 grams of $ClO_2$ per hour, with $NO_2$ conversion of 44%, it may be noted that with this specific arrangement of reaction zone, the conversion factor is 46±2% over a production range of 14 to 211 grams of chlorine dioxide per hour.

It is believed that a high ratio of effective reacting surface (over which the liquid spreads) to the volume of the reaction zone is of special importance in the process, e. g. the amount of reacting surface per unit volume in the tower, such volume including the space occupied by the packing material as well as the void space between the particles of packing. There is also some indication that the amount of reacting surface should be large relative to the void space; it seems particularly undesirable to permit the solution to collect in drops of appreciable magnitude. Furthermore, the useful or actual extent of the reacting surface appears to be determinable in large part by the material of its construction, or rather, by the surface configuration of such material, in that a given surface of porous alundum, for example, being fully wettable and having a non-polished or minutely porous character is in effect much more extended than one of glass having the same gross dimensions.

For example, in one test the two-inch tower described above was filled with the same kind and size of small alundum cylinders, somewhat less tightly packed, viz. 1825 grams of such material occupying 1470 cc. (to a height H of 28½ inches) and providing a total surface of 1.63 square meters (on gross dimensions), with 39% voids. With such arrangement, the conversion of $NO_2$ to $ClO_2$ was 40% (instead of 50%) over a range of chlorine dioxide output of 15 to 50 grams per hour; while a constant conversion factor of 40%, throughout a sufficient output range, represents useful operation, substantial departure below such value (as with looser packing) would give unsatisfactory results. In the example stated, with 1.63 sq. meters total area, the reaction area in square centimeters per cubic centimeter of total reaction zone volume was about 11, whereas in the previously stated examples of 2 inch and 1 inch towers it was about 11.9 and 12.3 respectively. These ratios, however, are based simply on the gross dimensions of the particles of packing. The effective surface area per unit volume was in an apparently important sense greater in such cases, because of the nature of the porous alundum used for the packing, than the numerical values indicate; where the towers were packed with glass particles of the same dimensions as the alundum particles in Examples I to IV respectively, the percent conversion of $NO_2$ became much less satisfactory. The fact that with the glass particles or the more loosely packed alundum a higher conversion factor could not be achieved upon reducing the rate of introduction of reactants, indicates that the ratio of surface area to volume, rather than the magnitude of surface area alone, is the more important factor.

The foregoing criteria of the reaction zone surface have been confirmed by numerous other tests. Thus it has been found that other materials may be successfully used for the particles of packing (so long as they are appropriately inert in a chemical sense), e. g. pumice, silica gel, and other grades of aluminum oxide, all being substances having porosity or at least a porous or minutely rough surface. Whereas in the examples specifically described above the alundum had a relatively high porosity, it was found that useful results (e. g. 43% conversion of $NO_2$) were obtainable with alundum of only so-called 30% porosity. The advantage of porosity appears (as implied above) to reside in the greater surface area; alundum particles or granules specially designed to have porosity only at or near the surface rather than internally, functioned as well as those made of material porous all the way through. Indeed as compared with glass (having an inherently polished and non-porous surface), even alundum rated at zero porosity (when made in particles and packed to afford a surface-to-volume ratio of not less than about 12 as measured above) seemed to have sufficient surface roughness to afford a minimum degree of utility, e. g. $NO_2$ conversion of 34%, while garnet particles (non-porous, though minutely less smooth than glass) yielded a conversion factor of about 40%.

In the case of glass particles of ordinarily available character, even these minimum results were not obtained, although the particle size was decreased (and surface area likewise increased) to the limit where the fineness of subdivision made the packed mass so dense as to impede the passage of liquid and gas objectionably. Generally speaking, with particles of the preferred surface character, the most useful size range has been found to be from about 6 to 20 mesh, the above examples representing 6 to 8 mesh. With granules larger than 6 mesh, even of highly porous alundum, pumice or the like, the yield (i. e. conversion) falls off markedly; reducing the size from 6 to 10 mesh or so increases the $NO_2$ conversion factor slightly (e. g. to 55% instead of 50%), but beyond the range of 10 to 20 mesh no improvement has been noted, and the friction loss, for the passage of the reagents, becomes undesirably high. Other conditions being equal, the shape of the particles does not seem critical. Spherical, rectangular and irregular shapes appear to function as well as the small cylinders described above.

Assuming the packing is of particles having the minutely rough surface character indicated above (preferably such as is at least equivalent to moderately porous alundum), the stated numerical values of area-to-volume ratio are nevertheless of significance, even though the areas are only apparent areas, based on the gross dimensions of the particles. As measured in square centimeters of gross-dimension surface per cubic centimeter of reaction zone, ratios of about 12 and upward seem necessary for optimum results; indeed there is a slight increase in conversion factor (i. e. yield, based on $NO_2$) with increase of the ratio up to about 28, but beyond such value of the ratio no improvement has been noted. At ratios below 12, the yield falls off, for example giving only a 40% conversion, under the specific conditions stated above, in the cited instance where the ratio was about 11. As explained, these ratios are only significant as related to (or for comparison, when understood to involve) particles of packing materials having a substantially rougher surface than ordinary glass, the area-increasing factor of such roughness (or surface porosity) being not itself included in the numerical value of the ratio.

While in some cases countercurrent flow of gas and solution through the apparatus may provide a process of limited utility (e. g. with $NO_2$ conversion of considerably less than 50%), concurrent flow, such as the drawing indicates, has been found peculiarly superior, affording much more satisfactory results. The reasons for this difference have not been fully ascertained, although it is believed that with countercurrent flow the onrush of gas tends to pile up the solution in the form of droplets so that the reaction in thin films is not possible.

Within the proper limits and conditions as now explained, the present process affords a safe, economical, and easily and reliably controlled way of generating chlorine dioxide. While the output gas may include some unreacted nitrogen peroxide and some chlorine, these incidental ingredients are not objectionable for most uses of the product, e. g. in treating flour or other materials. The procedure, moreover, can be carried out with relatively simple equipment, and without the use of costly or dangerous chemicals; it yields a steady flow of chlorine dioxide gas at any desired concentration that is compatible with safety.

It will be appreciated that whereas in practical performance of the process, adjustment can and preferably should be made of the chlorate solution feed as well as of the nitrogen peroxide supply to the tower, great convenience is served by the described operations wherein precise correlation of the two reagents is unnecessary and where adjustment of one alone, viz. the gas, can be relied upon for corresponding, faithful control of the desired product.

It is to be understood that the invention is not limited to the specific embodiments herein set forth but may be carried out in other ways within its spirit.

We claim:

1. A method of producing chlorine dioxide, comprising passing a gaseous mixture consisting of nitrogen peroxide and diluent gas and containing at least about 5% of nitrogen peroxide into a reaction zone of predetermined gross volume while advancing into said zone an aqueous chlorate solution consisting of water and soluble chlorate salt in concentration of chlorate of at least about 5 mols per liter, said solution being distributed as a thin film in said zone over a large effective surface area provided by distributed guiding structure which distributively fills said zone, said surface area being at least about as extensive per cubic centimeter of the gross volume of the zone as is provided by a packing, in a total zone of 352 cubic centimeters, of 431.5 grams of porous alundum cylinders averaging 2.9 mm. in diameter, 2.8 mm. in length and 0.0389 gram in weight, said solution being caused to travel through said zone and being thereby exposed to the gaseous mixture for reaction to produce chlorine dioxide, withdrawing from said reaction zone a gaseous mixture containing diluent gas and the produced chlorine dioxide, and separately withdrawing from said zone the spent liquid which originated as said aqueous chlorate solution, said introduced gaseous mixture and aqueous chlorate solution being advanced concurrently through said zone until withdrawal as said second-mentioned gaseous mixture and spent liquid respectively, and said nitrogen peroxide and chlorate being introduced to the reaction zone in a molecular ratio of $NO_2$ to chlorate ion between 0.5:1 and 1.5:1.

2. A method of producing chlorine dioxide, comprising passing a gaseous mixture consisting of nitrogen peroxide and diluent gas and containing at least 2% of nitrogen peroxide into a reaction zone of predetermined gross volume while advancing into said zone an aqueous chlorate solution consisting of water and soluble chlorate salt in a concentration of chlorate of at least 3 mols per liter, said solution being distributed in said zone as a thin film over a large effective surface which is provided by guiding structure distributively occupying the gross volume of the zone and which has a gross area of many square centimeters per cubic centimeter of said gross volume, the effective surface area of said guiding structure per cubic centimeter of distributively occupied volume being at least equal to that provided by a total surface of 1.6 square meters of alundum granules having a porosity of 30% in a zone having a volume of 1470 cubic centimeters, said solution being thereby exposed to the gaseous mixture for reaction therewith to produce chlorine dioxide, and withdrawing from said reaction zone a gaseous mixture containing diluent gas and the produced chlorine dioxide, while also withdrawing from said zone the spent liquid which originated as the aqueous chlorate solution, the introduced solution and gaseous mixture being advanced concurrently through the zone, and the nitrogen peroxide and chlorate being introduced in a molecular ratio not greater than 1.5:1.

3. A method of producing chlorine dioxide, comprising passing a gaseous mixture consisting of nitrogen peroxide and diluent gas and containing at least about 2% of nitrogen peroxide into a reaction zone of predetermined gross volume while advancing into said zone an aqueous chlorate solution consisting of water and soluble chlorate salt in concentration of chlorate of at least about 3 mols per liter, said solution being distributed as a thin film in said zone over a large effective surface area provided by distributed guiding structure which distributively fills said zone, said surface area being at least about as extensive per cubic centimeter of the gross volume of the zone as is provided by a packing, in a total zone of 352 cubic centimeters, of 431.5 grams of alundum cylinders averaging 2.9 mm. in diameter, 2.8 mm. in length and 0.0389 gram in weight, said solution being caused to travel through said zone and being thereby exposed to the gaseous mixture for reaction to produce chlorine dioxide, the introduced solution and gaseous mixture being advanced concurrently through the zone, withdrawing from said reaction zone a gaseous mixture containing diluent gas and the produced chlorine dioxide, and separately withdrawing from said zone the spent liquid which originated as said aqueous chlorate solution.

4. A method of producing chlorine dioxide, comprising passing a gaseous mixture consisting of nitrogen peroxide and diluent gas and containing at least 2% of nitrogen peroxide into a reaction zone of predetermined gross volume while advancing into said zone an aqueous chlorate solution consisting of water and soluble chlorate salt in a concentration of chlorate of at least 3 mols per liter, said solution being distributed in said zone as a thin film over a large surface which is provided by guiding structure distributively occupying the gross volume of the zone and which has a gross area of at least 11 square centimeters per cubic centimeter of said gross volume, for exposure of the solution to the gaseous mixture and reaction therewith to produce chlorine dioxide and withdrawing from said reaction zone a gaseous mixture containing diluent gas and the produced chlorine dioxide, while also withdrawing from said zone the spent liquid which originated as the aqueous chlorate solution, the introduced solution and gaseous mixture being advanced concurrently through the zone, the surface over which the solution is distributed in the zone having minute roughness at least equivalent to that of garnet and providing an effective area of solution distribution correspondingly greater than represented by said ratio of 11:1.

5. A method of producing chlorine dioxide, comprising passing a gaseous mixture consisting of nitrogen peroxide and diluent gas and containing at least about 5% of nitrogen peroxide into a reaction zone of predetermined gross volume while advancing into said zone an aqueous chlorate solution consisting of water and soluble chlorate salt in concentration of chlorate of at least about 5 mols per liter, said solution being distributed as a thin film in said zone over a large surface which is provided by guiding structure distributively occupying the gross volume of the zone and which has a gross area of at least about 11.5 square centimeters per cubic centimeter of said gross volume, said surface of the guiding structure having minute roughness at least equivalent to that of garnet, and said solution being caused to travel through said zone and being confined therein, as said thin film, to void spaces having a total volume equal to not more than about 40% of the aforesaid gross volume of the zone, said aqueous solution being thereby exposed to the gaseous mixture for reaction to produce chlorine dioxide, withdrawing from said reaction zone a gaseous mixture containing diluent gas and the produced chlorine dioxide and separately withdrawing from said zone the spent liquid which originated as said aqueous chlorate solution, said introduced gaseous mixture and aqueous chlorate solution being advanced concurrently through said zone until withdrawal as said second-mentioned gaseous mixture and spent liquid respectively, and said nitrogen peroxide and chlorate being introduced to the reaction zone in a molecular ratio of $NO_2$ to chlorate ion between 0.5:1 and 1.5:1.

6. The method of claim 5 wherein the solution is distributed over a surface provided by said guiding structure in said zone and having a gross area of at least about 12 square centimeters per cubic centimeter of said gross volume, said surface having minute roughness at least equivalent to that of alundum which has a porosity substantially greater than 30%, and said surface thereby providing an effective area of solution distribution correspondingly greater than represented by said ratio of 12 square centimeters per cubic centimeter of gross volume.

7. In procedure for producing chlorine dioxide, the improvement which consists in passing nitrogen peroxide gas diluted with diluent gas amounting to a major proportion by volume of the total of said diluent and nitrogen peroxide, into a reaction zone of predetermined gross volume while advancing concurrently into said zone an aqueous solution consisting of water and soluble chlorate salt and having a chlorate concentration of at least 2 mols per liter, said solution as it passes through said zone being distributed as a thin film over guiding structure of solid material distributed throughout the zone, said solid material leaving only a minor part of said gross volume as void spaces, and said guiding structure providing, in exposure to said void spaces, a large effective surface which distributes the solution in a film at least as thin, and at least as extensive per cubic centimeter of said gross volume, as is provided by 6 to 8 mesh alundum particles packed to afford 11 square centimeters of gross surface area per cubic centimeter of the space packed, said solution traveling through said zone concurrently with, and in exposure to, said dilute nitrogen peroxide, for reaction therewith to produce chlorine dioxide, and withdrawing from said reaction zone a gaseous mixture containing diluent gas and the produced chlorine dioxide, while also withdrawing from said zone the spent liquid which originated as the aqueous chlorate solution.

8. In procedure for producing chlorine dioxide, the improvement which consists in passing nitrogen peroxide gas diluted with diluent gas amounting to a major proportion by volume of the total of said diluent and nitrogen peroxide, into a reaction zone of predetermined gross volume while advancing concurrently into said zone an aqueous solution consisting of water and soluble chlorate salt and having a chlorate concentration of at least 3 mols per liter, said solution as it passes through said zone being distributed as a thin film over guiding structure of solid material distributed throughout the zone, said guiding structure providing a large, distributed, solution-receiving surface which has minute roughness at least equivalent to that of garnet and which has an area of many square centimeters per cubic centimeter of the aforesaid gross volume of the zone, said solution traveling through said zone as the aforesaid film and concurrently with, and in exposure to, said dilute nitrogen peroxide for reaction therewith to produce chlorine dioxide, and withdrawing from said reaction zone a gaseous mixture containing diluent gas and the produced chlorine dioxide, while also withdrawing from said zone the spent liquid which originated as the aqueous chlorate solution, said nitrogen peroxide and chlorate being introduced to the reaction zone in a molecular ratio of $NO_2$ to chlorate ion not greater than 2:1.

HENRY C. MARKS.
ROBERT R. JOINER.

REFERENCES CITED

The following references are of record in the file of this patent:

UNITED STATES PATENTS

| Number | Name | Date |
|---|---|---|
| 2,089,913 | Cunningham | Aug. 10, 1937 |
| 2,155,007 | Edwards et al. | Apr. 18, 1939 |
| 2,332,181 | Soule | Oct. 19, 1943 |
| 2,409,862 | Hutchinson | Oct. 22, 1946 |
| 2,451,826 | Haller | Oct. 19, 1948 |
| 2,475,286 | Hutchinson | July 5, 1949 |